United States Patent [19]

Wardle

[11] Patent Number: 4,966,065
[45] Date of Patent: Oct. 30, 1990

[54] MULTIPLEXED HYDRAULIC CONTROL SYSTEMS

[75] Inventor: John W. Wardle, Roscoe, Ill.

[73] Assignee: Woodward Governor Company, Rockford, Ill.

[21] Appl. No.: 298,939

[22] Filed: Jan. 23, 1989

[51] Int. Cl.$^5$ ............................................. F15B 13/06
[52] U.S. Cl. ...................................... 91/361; 91/529; 91/536; 137/596.15
[58] Field of Search ................. 91/179, 180, 361, 459, 91/470, 521, 524, 529, 536; 137/596.15, 596.16

[56] References Cited

U.S. PATENT DOCUMENTS

| | | | |
|---|---|---|---|
| 3,645,141 | 2/1972 | Moore et al. | 73/420 |
| 4,191,215 | 3/1980 | Gonner | 137/870 |
| 4,271,867 | 6/1981 | Milberger et al. | 137/625 |
| 4,325,127 | 4/1982 | Major | 364/510 |
| 4,664,136 | 5/1987 | Everett | 137/85 |
| 4,838,145 | 6/1989 | Slocum et al. | 91/536 |
| 4,860,145 | 8/1989 | Hosono et al. | 91/536 |

OTHER PUBLICATIONS

"Imagine . . . A Self–Calibrating Pressure Transducer" advertisment for Scanivalve Corp., San Diego, Calif.
"Metering Valve W/Regulator" article, Tech Data South Bend Controls Inc. Bulletin, PV-210, SBC, 6/1987.
"Metering Valve" article, Tech Data South Bend Controls Inc. Bulletin, PV-211, SBC, 6/1987.
Article entitled "Actuator Accepts Electrical Digital Control Signals Directly—Eliminates Digital-To-Analog Converters", 4/1989.

Primary Examiner—Robert E. Garrett
Assistant Examiner—George Kapsalas
Attorney, Agent, or Firm—Leydig, Voit & Mayer

[57] ABSTRACT

A time multiplexed hydraulic control system in which a multiple section dog valve is multiplexed among a plurality of channels. An electrical actuator on the dog valve controls pilot means. The pilot means is associated with a plurality of followers, one for each channel, and each follower controls the flow rate through an associated output port. Multiplexing means in the dog valve sequentially supplies fluid to the pilot means for sequentially positioning then locking the respective followers. Thus, each channel has continuous hydraulic flow based on the position of its dedicated follower, with the followers being repositioned on a multiplexed basis in associated time slots.

6 Claims, 5 Drawing Sheets

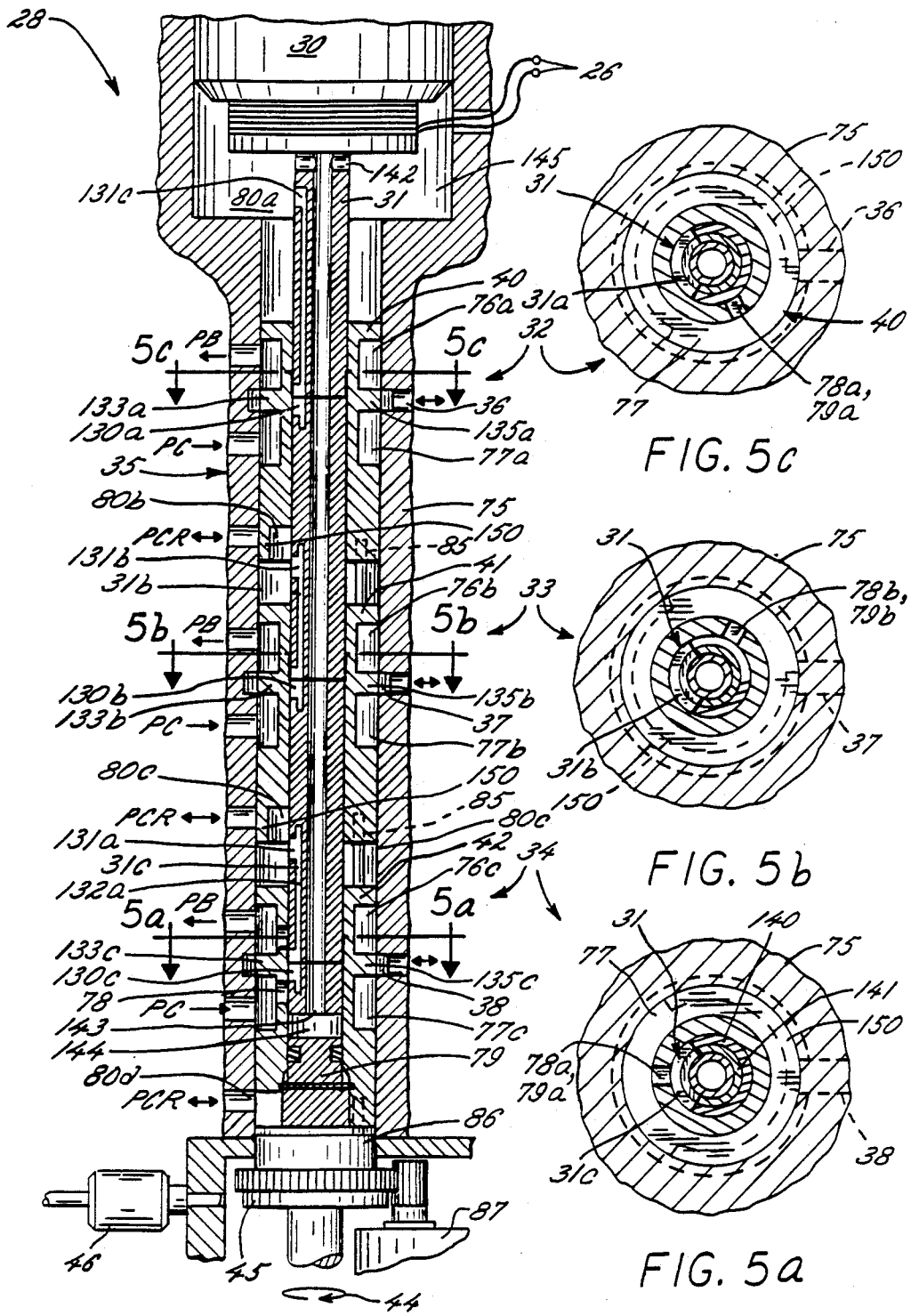

MULTIPLEXED HYDRAULIC CONTROL SYSTEMS

BACKGROUND OF THE INVENTION

1. Field of the Invention

This invention relates to hydraulic control systems, and more particularly to hydraulic systems in which a plurality of hydraulic actuators are to be precisely positioned in dependence on the magnitude of a similar plurality of electrical control signals.

2. Description of the Prior Art

There are numerous such control systems, and this invention would represent a significant advantage in connection with many of them. One exemplary and very significant application of such controls is in aircraft systems where hydraulic controls are provided for adjusting mechanical variables in jet aircraft engines. The gas turbine engines which are used to power conventional jet aircraft have commonly used hydraulic actuators for control of air valves, fuel valves, engine variable geometry, and the like. As engine designers attempt to achieve more and more performance from the gas turbine, the number of hydraulic actuators has increased significantly, and may approach 17 in number. Even gas turbine engines used on older commercial aircraft typically have on the order of six hydraulic actuators.

Heretofore, each hydraulic actuator was provided with a device to convert an electrical input signal into a mechanical position of the actuator. Most typically, that had been done with a torque motor connected to and driving a hydraulic servo valve; the servo valve, in turn, controlled the supply of hydraulic fluid to the actuator. Both torque motors and servo valves are fairly expensive, and both are fairly weighty components, particularly for aircraft applications where weight savings on the order of pounds can translate into substantial operating cost savings over the life of the aircraft.

Applicant is aware of a concept having been proposed to reduce weight and cost in such systems, by using a single pilot valve multiplexed among a plurality of actuators. In substance, the pilot valve has a spool which is rotated for multiplexing, and which is positioned vertically by the torque motor to establish a control position. The spool and valve would be modified to provide a plurality of ports at different angular positions of the spool such that the vertical control position of the valve combined with a plurality of angular multiplex positions could be used to sequentially deliver hydraulic fluid to a plurality of actuators.

It is applicant's belief that a system of that type could not be reduced to practice for any but the most rudimentary systems because of a number of limitations, the most prominent one being the substantially reduced flow rate to any given actuator for a servo valve of any reasonable size. The flow rate reduction is a result of two factors—(1) reduced flow through a pilot valve which is configured as a multiplexer, and (2) the fact of multiplexing itself which has flow going to an actuator only during its time slot. Thus, while in principle the system might work in applications where speed of response and fineness of control are not important criteria, in a jet engine control, for example, the concept would not appear to be workable.

Multiplexing of hydraulic circuits is not broadly new. It can be used for example in sharing a single transducer among a number of hydraulic or pneumatic channels, such as illustrated in Moore et al. U.S. Pat. No. 3,645,141. The opportunity to share a control servo valve among multiple actuators is also suggested in the literature, but not on a simultaneous real time basis, insofar as applicant is aware. Applicant, however, knows of no application where multiplexing has been successfully used in control of high performance hydraulic systems such as for gas turbine engine control, where the requirements are for precise position control, a wide range of controllable actuator speeds, and a demand, at least for some channels, of high speed controlled movement of the actuator. Thus, while a pressure sensing application (e.g., Moore) can be configured to share a single transducer among multiple channels, because no substantial fluid flow is required for that application, and while in low performance applications it may be possible to selectively connect different hydraulic circuits to a single servo valve, it has not heretofore been possible to accurately control a plurality of high performance actuators which require substantial fluid flow to generate adequate force or sufficient rate of movement in a hydraulically multiplexed system. It is for those reasons, perhaps among others, that designers have traditionally thought in terms of one control for one actuator in applications like aircraft engines where a plurality of such actuators must be capable of simultaneous action and have a relatively high fluid flow rate needed in order to meet performance requirements.

The concept of hydraulic amplification is also known, and is used, for example, where the flow rate required by an actuator is much higher than the flow capacity of an associated pilot valve. One example of a hydraulic amplification device is the dog valve in which a relatively low flow rate pilot apparatus controls the position of a follower which in turn controls a much higher flow rate. The pilot and follower, by virtue of their mechanical association, have built-in mechanical feedback which helps to assure system stability. While the dog valve can thus achieve hydraulic amplification, it has been applied only, insofar as applicant is aware, in a one valve per channel implementation, thus requiring a complete dog valve and actuator assembly per channel to be controlled.

SUMMARY OF THE INVENTION

In view of the foregoing, it is a general aim of the present invention to provide a practical and reliable multiplexing hydraulic control for high precision servo systems.

In that regard, it is an object of the present invention to provide a reliable highly accurate multiple channel hydraulic control in which the control elements are shared among a plurality of actuators without substantial sacrifice of positioning speed or accuracy.

A further object is to provide a multiplexed hydraulic control system which is capable of providing continuous hydraulic flow in the multiplexed output channels while assuring system stability within the hydraulic system.

According to one aspect of the invention, an object is to provide such a control capable of meeting the control requirements for modern gas turbine engines.

It is a feature of the present invention that size and weight reduction are achieved by multiplexing a single electrical actuator among a plurality of hydraulic channels without substantial sacrifice of system response time or accuracy by virtue of utilizing a dog valve as a hydraulic sample and hold device between the actuator and the output devices. Pilot means in the dog valve is sequentially controlled by time division multiplexed signals applied to the single electrical actuator, and is of sufficiently low flow rate that the electrical actuator is of reasonable size and has adequate response time. Multiplexing means are provided for sequentially activating the pilot means in associated time slots, to position a plurality of followers associated with the respective channels during the time slot associated with each channel. During the time slot associated with other channels, the follower remains in its last position to control the flow rate to the associated channel, such that outlet flow can be continuous even though the follower is repositioned only during its associated time slot.

Other objects and advantages will become apparent from the following detailed description when taken in conjunction with the drawings, in which:

BRIEF DESCRIPTION OF THE DRAWINGS

FIG. 2 illustrates, partly in vertical section, the multiplexed dog valve of the system of FIG. 1;

FIGS. 5a-5c are sectional views taken along the corresponding sectional lines of FIG. 2 better illustrating the multiplexing of the pilot valve;

DETAILED DESCRIPTION OF THE PREFERRED EMBODIMENTS

While the invention will be described in connection with certain preferred embodiments, there is no intent to limit it to those embodiments. On the contrary, the intent is to cover all alternatives, modifications and equivalents included within the spirit and scope of the invention as defined by the appended claims.

Figure 1:
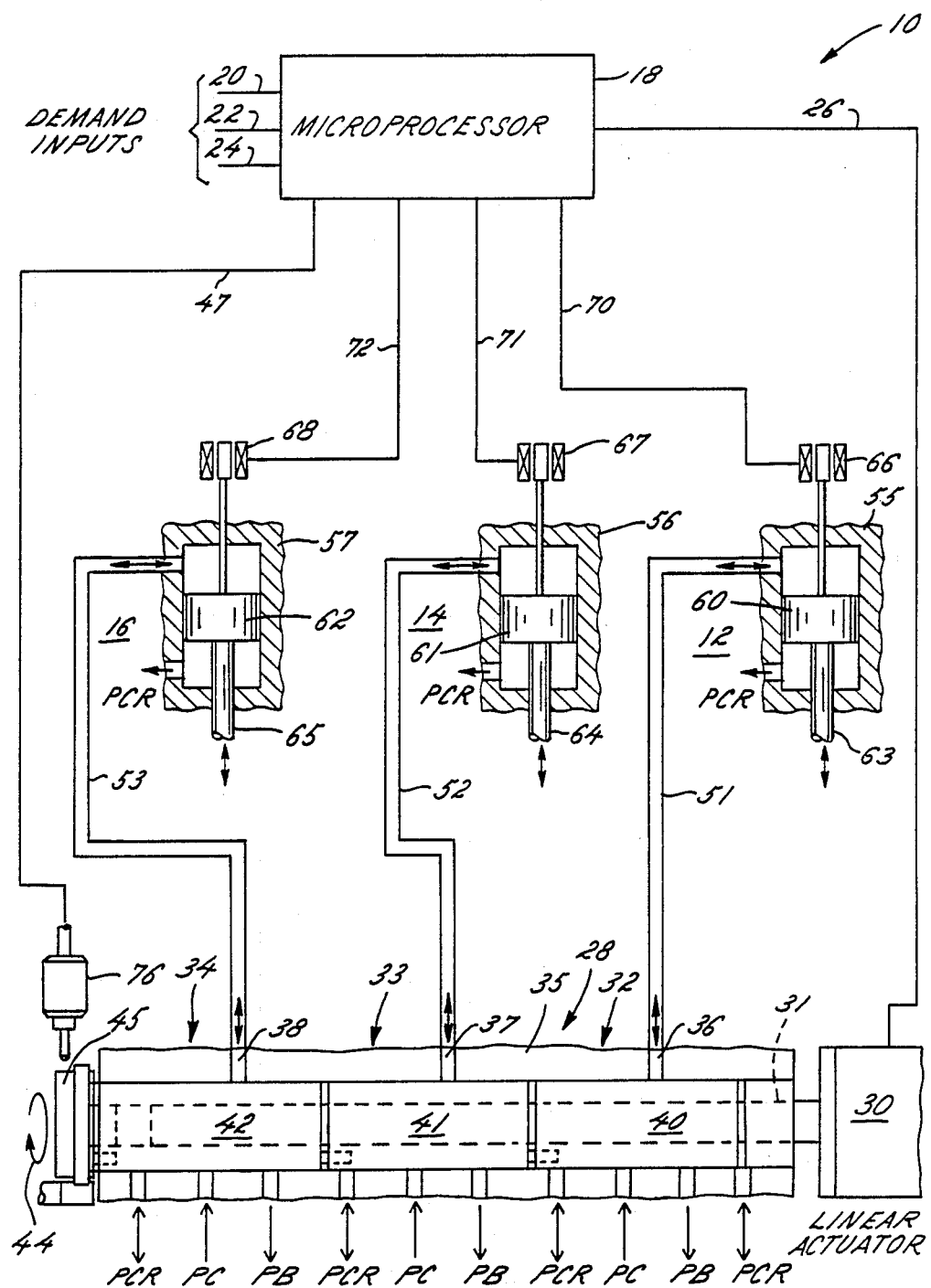
FIG. 1 is a schematic illustration showing a three actuator multiplexed system exemplifying the present invention.

Turning now to the drawings, FIG. 1 illustrates, partly in schematic form, the major elements of a hydraulic multiplexed control system exemplifying the present invention. More particularly, FIG. 1 illustrates a hydraulic control system 10, in the illustrated embodiment a time division multiplexed (TDM) system having a plurality of channels, FIG. 1 illustrating a relatively simple system having only three channels 12, 14, 16. A control means, illustrated as microprocessor 18, coordinates the elements of the system and establishes control set points and control signals for positioning actuators in each of the channels. The actuators in turn, may be used to control physical elements such as jet aircraft control devices which establish fuel feed rate, variable engine geometry positions, etc.

The microprocessor 18 receives an electrical input signal for each channel on input lines 20, 22, 24 and processes those input demand signals along with feedback signals and the like to produce a control signal for each channel which is related to the demanded position of the actuator in the channel. Those control signals are output on a TDM bus 26 in respective time slots and transmitted on the bus 26 to a hydraulic control 28 shown herein as a multiplexed dog valve. The dog valve in FIG. 1 is only schematically illustrated, but for the moment it is sufficient to understand that the dog valve responds to each of the electrical signals in sequence on the TDM bus 26 to produce hydraulic fluid flow at controlled rates for output to the associated channels.

The hydraulic control 28 includes electrical actuator means 30 for translating the electrical signals on TDM bus 26 into flow rates in the associated channels. The electrical actuator 30 controls the position of pilot means diagrammatically illustrated at 31 for individual multiplexed sections 32, 33, 34 of a multiplexed dog valve 35. It is seen that each of the sections 32, 33, 34 has a plurality of inputs, one being connected to a high pressure hydraulic source PC, a second to hydraulic sump PB and a third to an intermediate regulated pressure PCR. As will be described in greater detail below, those hydraulic inputs serve to operate both the pilot means 31 as well as to supply fluid at a controlled rate to outlet ports 36, 37, 38 associated with respective sections 32, 33, 34.

Associated with the pilot means 31 in each section 32-34 are individual followers 40, 41, 42 which control the flow rate to the outlet ports. Multiplexing is preferably accomplished by rotation of elements of the dog valve, in the illustrated embodiment by rotation of the followers 40-42 which are pinned for rotation in unison in such a way that the vertical distance between the followers is independently adjustable. Rotation for purposes of multiplexing is indicated in the FIG. 1 embodiment by means of arrow 44. The angular position of the valve is sensed by means of angular position indicator 45 which rotates with the valve, operating in conjunction with detector 46 which couples signals on a line 47 back to the microprocessor 18. As a result, the microprocessor has sufficient information to keep the TDM signals on electrical bus 26 in time with the rotary position of the valve so that the control signals for each channel control flow to their assigned servo actuator.

In summary, the electrical actuator 30 positions the pilot means 31 for a time slot associated with each section 32-34. During the time slot associated with a given section, say section 32, positioning of the pilot means 31 causes the follower 40 to reposition itself in accordance with the pilot position, and the position of the follower in turn controls the flow rate from the inlet ports PC or PB to the outlet port 36. That follower, i.e., follower 40, is then locked in its newly adjusted position while the electrical actuator 30 positions the pilot means 31 in the next time slot to adjust the next follower 41.

It will now be apparent that although the dog valve 35 is multiplexed, the structure provides for continuous flow from the respective outlets 36, 37, 38, thereby providing a substantial improvement over a multiplexed pilot valve which would have flow for only one third (in a three-channel system) of each rotational cycle of the multiplexer. More particularly, using the illustrated dog valve, although the duty cycle for adjusting each of the followers 40, 41, 42 is only approximately 33% (i.e., one-third of each cycle), the flow rate can have a 100% duty cycle, providing substantially increased fluid flow to the actuators.

It is seen in FIG. 1 that the outlet ports 36, 37, 38 are connected via hydraulic conduits 51, 52, 53, respectively to servo actuators 55, 56, 57 in the respective channels. Each actuator has a piston 60, 61, 62 which is displaced by fluid flow either into or out of the lower chamber of the servo actuator to drive a piston rod 63, 64, 65, respectively in the advance or retard directions.

For purposes of providing feedback information to the microprocessor for use in actuator position control, each channel 12, 14, 16 includes an associated electrical feedback element 66, 67, 68, connected to the associated piston so as to provide an electrical signal which is indicative of the piston position and, if necessary, rate of piston travel. Such electrical signals produced by the feedback elements 66, 67, 68 are coupled via electrical connections 70, 71, 72, respectively, back to the microprocessor 18 to serve as inputs for the control loops in determining whether the actual actuator position as measured by the feedback elements matches the demanded position represented by signals on input lines 20, 22, 24.

Turning now to FIG. 2, there is shown in greater detail the structure of an exemplary electrohydraulic multiplexed control element 28. The multiplexed hydraulic control includes an electrical actuator, in the illustrated embodiment in the form of a linear actuator such as voice coil 30. The voice coil, a magnetic driver typically used in audio speakers, has a stationary magnet and a low mass movable coil which is attached to the movable pilot means 31. The voice coil provides the advantage of a greater range of controllable positioning, less moving mass, and greater expected life in multiplexing applications where the spool can be expected to be repositioned multiple times during each TDM cycle.

The electrical connections to the voice coil 30 designated 26 in FIG. 2 illustrate that the time division multiplexed signals on bus 26 are used to control the position of the electrical actuator 30 in response to the magnitude of the signals delivered from the microprocessor. As noted above, attached to and controlled by the electrical actuator 30 is pilot means 31. In the illustrated embodiment, the pilot means 31 includes three sets of pilot ports 31a, 31b, 31c, one for each of the channels. The exemplary pilot means 31 is comprised of three concentric closely fitting thin-walled tubes which allow easier fabrication of the internal pilot ports. In FIG. 2 and its partial sections FIGS. 3a-4b, the lines separating the tubes have been omitted except at the pilot port areas in order to avoid confusing the presentation of the porting arrangement. However, FIGS. 5a-5c illustrate the individual tube sections which make up the pilot means 31. While FIG. 2 illustrates a pilot means with individual pilot ports for each of the channels, it is also possible in a modified structure, to share a single pilot means among a plurality of channels.

The followers 40, 41, 42 for the respective sections 32, 33, 34 are cylindrical elements with a central aperture for receiving the pilot means 31. The cylindrical elements in turn ride within a cylindrical body 75 which is ported as illustrated in FIG. 2. More particularly, each of the sections 32-34 includes an inlet connection designated PC for high pressure hydraulic fluid, a sump connection designated PB for hydraulic sump, and an intermediate pressure connection PCR for receiving a third supply of hydraulic fluid at a regulated pressure intermediate the high pressure and sump. The body 75 is also ported to provide outlet ports 36, 37, 38 and, if desired, a second set of outlet ports 36a, 37a, 38a.

Referring to the valve section 34 as exemplary of the porting configuration of the other sections, it is seen that the high pressure and sump inlet ports communicate with annular channels 76c, 77c formed in the outer periphery of the follower 42. As a result, during the time slot associated with valve section 34, high pressure and sump are coupled through internal multiplexing ports 78c, 79c to the pilot means 31, in addition to the continuous coupling by means of the annular channels 76c and 77c to the outlet port 36. The multiplexing ports 78c, 79c in the time slot for the associated channel communicate with pilot port 31c assigned to that channel. It is seen that pilot port 31c has an inlet port 130c cooperating with a metering land 133c on the follower and an outlet port 131c which is open to a chamber 80c separating followers 41 and 42. In the position illustrated in FIG. 2, the metering land 133c closes the port 130c, preventing either the high pressure source PC or the sump PB from being connected to the pilot port 31c. However, during the time slot associated with the channel 34, if the pilot means 31 is either raised or lowered from the illustrated position, the metering land 133c will open the port 130c allowing fluid flow through the pilot port 31c and into or out of the chamber 80c, depending on whether the metering land opens the pilot port to the high pressure source PC or sump PB. By virtue of the fact that the intermediate regulated pressure PCR is connected to chamber 80d below the follower, when the land 133 opens the port 130c to allow fluid flow into or out of the chamber 80the follower 42 will be displaced in the same direction as the pilot means, ultimately moving a distance sufficient to position the metering land 133c over the pilot port 130c, terminating fluid flow to the chamber 80c. However, by virtue of the movement of the follower 42, a metering land 135c which in the illustrated condition closes the outlet port 38 will be repositioned, thus allowing fluid flow from either the high pressure source PC or the hydraulic sump PB to the outlet port 38, depending on the direction in which the follower has been displaced. Thus, the follower 42 follows the pilot means in dog valve fashion to controllably direct fluid flow to its outlets.

Figures 3A, 3B:
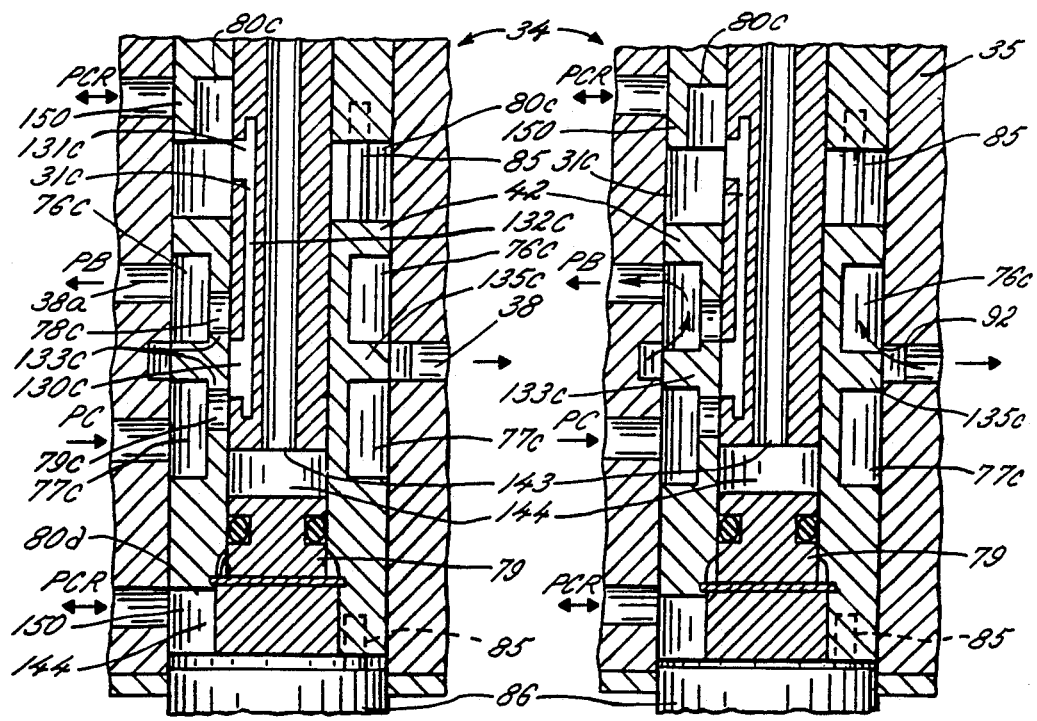
FIGS. 3a and 3b are partial sectional views illustrating pilot and follower action in opening the outlet port to hydraulic sump.

Turning now to FIGS. 3a and 3b, the repositioning of one section of the dog valve will be further demonstrated. It is seen that FIGS. 3a and 3b illustrate the lower section 34 of the three section valve of FIG. 2, including the follower 42 which controls the outlet port 38. In the position illustrated in FIG. 3a, even though high pressure hydraulic fluid is applied to the port PC and low pressure sump to the port PB and from thence via circumferential channels 76c and 77c to the interior of the valve, by virtue of the follower position the metering land 135c has closed the port 38. In the illustrated condition, there will be no fluid flow in the associated channel 16. However, in the time slot assigned to channel 16, assume that the pilot means has been repositioned from the quiescent position illustrated in FIG. 2 to the slightly lower position illustrated in FIG. 3a in which fluid can flow from the hydraulic source PC through open port 130e to the internal pilot port 31c. As a result, fluid will flow through the port 31c and into the chamber 80c above the follower 42. Thus, with the intermediate pressure PCR connected to the chamber 80d below the follower, the fluid pressure above will force the follower down until the port 130 is closed. In that way, the follower follows the pilot to assume a new position. However, as illustrated in FIG. 3b, that new position is lower than illustrated in FIG. 3a. It is seen that in that position, the land 133c has closed pilot channel 130e, and the lowered position of the follower 42 has caused the land 135c to partly open the port 38 to sump PB, allowing fluid to flow as illustrated by the arrow 92. Fluid will continue to flow at the rate set by the just completed adjustment until in a time slot for the channel in question the spool is repositioned and followed by the follower to readjust the degree of opening of outlet port 38.

Figures 4A, 4B:
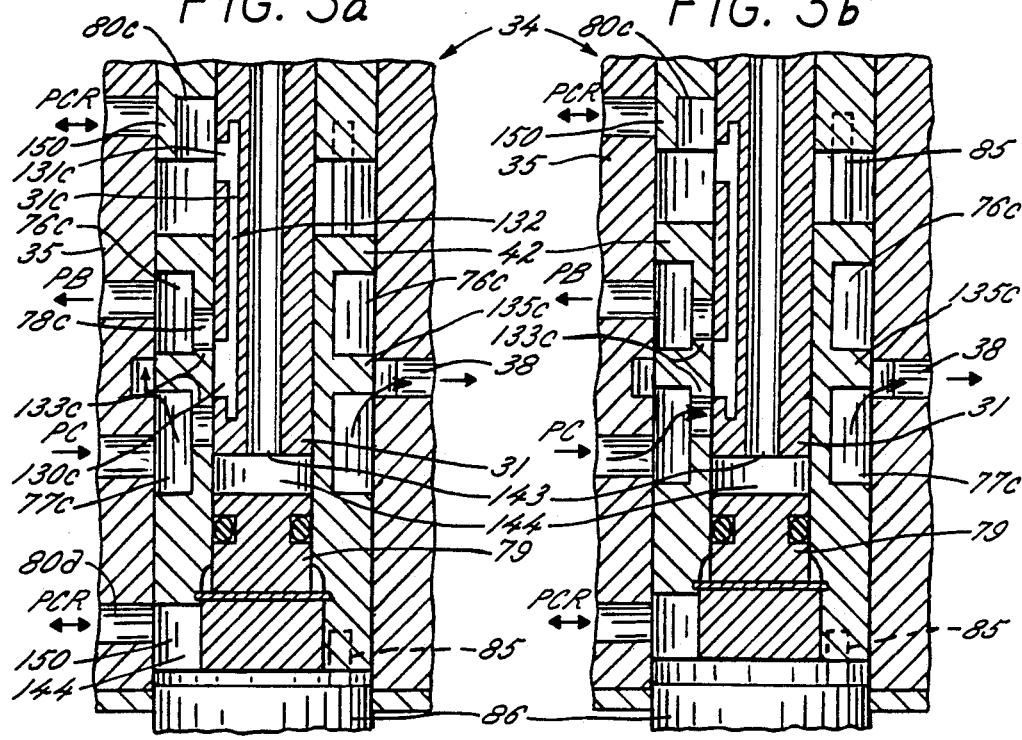
FIGS. 4a and 4b are partial sectional views illustrating pilot and follower action in opening the outlet port to the high pressure hydraulic source.

Turning now to FIGS. 4a and 4b, there is shown an adjustment in the opposite direction in which the high pressure hydraulic source PC is connected through circumferential channel 77c to the outlet port 38. In FIG. 4a, the metering land 135c is shown in a previously adjusted position in which the port 38 is slightly open for fluid flow at a given rate. Also in FIG. 4a, it is assumed that the time slot associated with channel 16 has just commenced and the spool has been raised to a position higher than the current position of the follower in order to further open the outlet port 38. It is seen that in such raised condition for fluid flow is to the hydraulic sump PB from the pilot port 31c and the chamber 80c above the follower 42. By virtue of the fact that the intermediate pressure PCR is below the follower chamber 80d, the follower will be forced upwardly to the position illustrated in FIG. 4b wherein the land 133c has closed the pilot passage 130c. However, the output land 135c is further raised from the position illustrated in FIG. 4a to further increase fluid flow to the associated channel.

Figure 6:
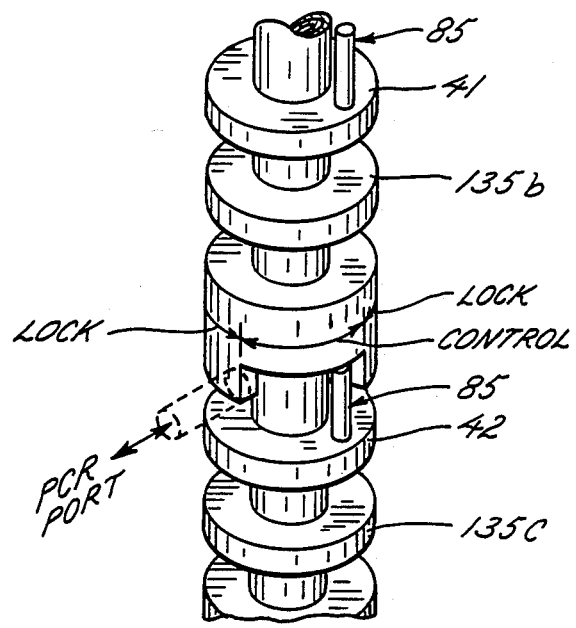
FIG. 6 is a partial perspective view illustrating the lower portion of the valve of FIG. 2.

In accordance with the present invention, a plurality of dog valve followers are associated with multiplexed pilot means driven by the actuator 30 in order to continuously control hydraulic flow to a plurality of channels. Thus, the channels 32, 33, 34 each have an associated follower 40, 41, 42 which is positioned during the time slot associated with the respective channel, then locked in position to continuously control flow through the associated outlet port 36-38. In order to accomplish multiplexing in the illustrated embodiment, the followers 40-42 have staggered multiplexing ports so that the pilot ports 31a-31c are sequentially activated for about one-third of a full cycle, while the lower chamber is opened for the same third to PCR by the skirt on followers 40-42 (see FIG. 6) and the followers 40-42 are rotated to sequentially activate those ports.

In order to rotate the followers 40-42 within the valve body 75, the followers are connected to each other in a manner which allows vertical repositioning of one follower with respect to the other. In the illustrated embodiment, pins 85 connect respective pairs of followers but are vertically slidable in at least one of the followers so that the distance between followers can be adjusted as the individual channels are controlled by the electrical actuator. The lowermost follower 42 is connected by means of coupling 86 to a drive motor 87 such that energization of the drive motor 87 rotates the coupling 86 and thereby all of the followers 40-42 in synchronism. The position encoder 45 in the form of a gear or the like and the position sensor 46 in the form of a magnetic pickup or the like are also illustrated in FIG. 2 and serve, as described above, to provide electrical position signals for allowing the microprocessor to synchronize the electrical signals on the bus 26 with the mechanical position of the multiplexer.

The multiplexing of the pilot means is best appreciated with respect to FIGS. 5a-5c in conjunction with FIG. 2. Those figures illustrate that the pilot means, in the illustrated embodiment, is comprised of three closely fitting concentric thin-walled tubes for forming the pilot passages 31a-31c. The outer tube 140 has multiplexing sections 130, 131 cut away, in a three channel system of approximately 120°, forming the inlet and outlet of the pilot passage 31. The next innermost tube 141 forms the vertical passage for the pilot port 31 interconnecting the approximately 120° sections formed in the outer tube 140. The central tube has no porting for the pilot means and merely serves to support the other tubes. However, the inner tube is ported at 142 and 143 to allow fluid to be displaced between the passages 144 and 145 as the actuator 30 moves pilot means 31 up and down within the valve.

Cooperating with the 120° multiplexing segments 130, 131 are rotatable multiplexing ports 78, 79 which serve to sequentially activate the pilot ports 130, 131. Thus in the position illustrated in FIGS. 2 and 5a-5c, it is seen that the ports 130c, 131c are in communication with the 120° segments 78c, 79c, activating the lowermost section of the dog valve. It is seen that in the same condition the ports 147b and 147a of the two uppermost sections are closed and are adapted to be opened later in the cycle in the associated time slot as the multiplexing valve is rotated.

FIGS. 2, 5a-5c and 6 also illustrate multiplexing means for opening and closing the intermediate pressure port PCR in associated time slots. It is seen that each follower has a skirt 150 which occupies approximately 240° of the follower circumference, such that the chamber 80b-80d below the respective followers is controllably opened for 120° of the rotational cycle, i.e., the time slot for the associated channel. Referring to FIG. 5a, it is seen that the passage below the spool 42 is open to regulated pressure PCR during the time the multiplexing ports 78c, 79c are open to the pilot 31c. Thus, if the spool is raised or lowered when the multiplexer is in the position illustrated in FIG. 5a, whatever fluid is ported to the passage 80c above the spool 42 will allow the spool to be raised or lowered as a result of opening the lower chamber to the intermediate pressure PC. However, when the spool rotation closes the multiplexing ports, the lower chamber will also be closed, keeping the follower locked in position until its assigned time slot in the next cycle. Thus, the spool vertical position in each time slot will allow readjustment of the associated follower by virtue of connection of the internal pilot ports 31a-31c (in sequence) through the multiplexing follower ports 78, 79. The fluid flow through the associated pilot channels will allow the followers to be repositioned, after which the multiplexing ports will seal both the pilot and the intermediate pressure PC to lock the follower in position until a subsequent time slot for that channel. Thus, flow through all of the outlet ports 36, 37, 38 is independently controllable but remains constant between adjustments. In short, while the control duty cycle in the three channel system is only about 33%, the output duty cycle can be 100%.

Figure 7:
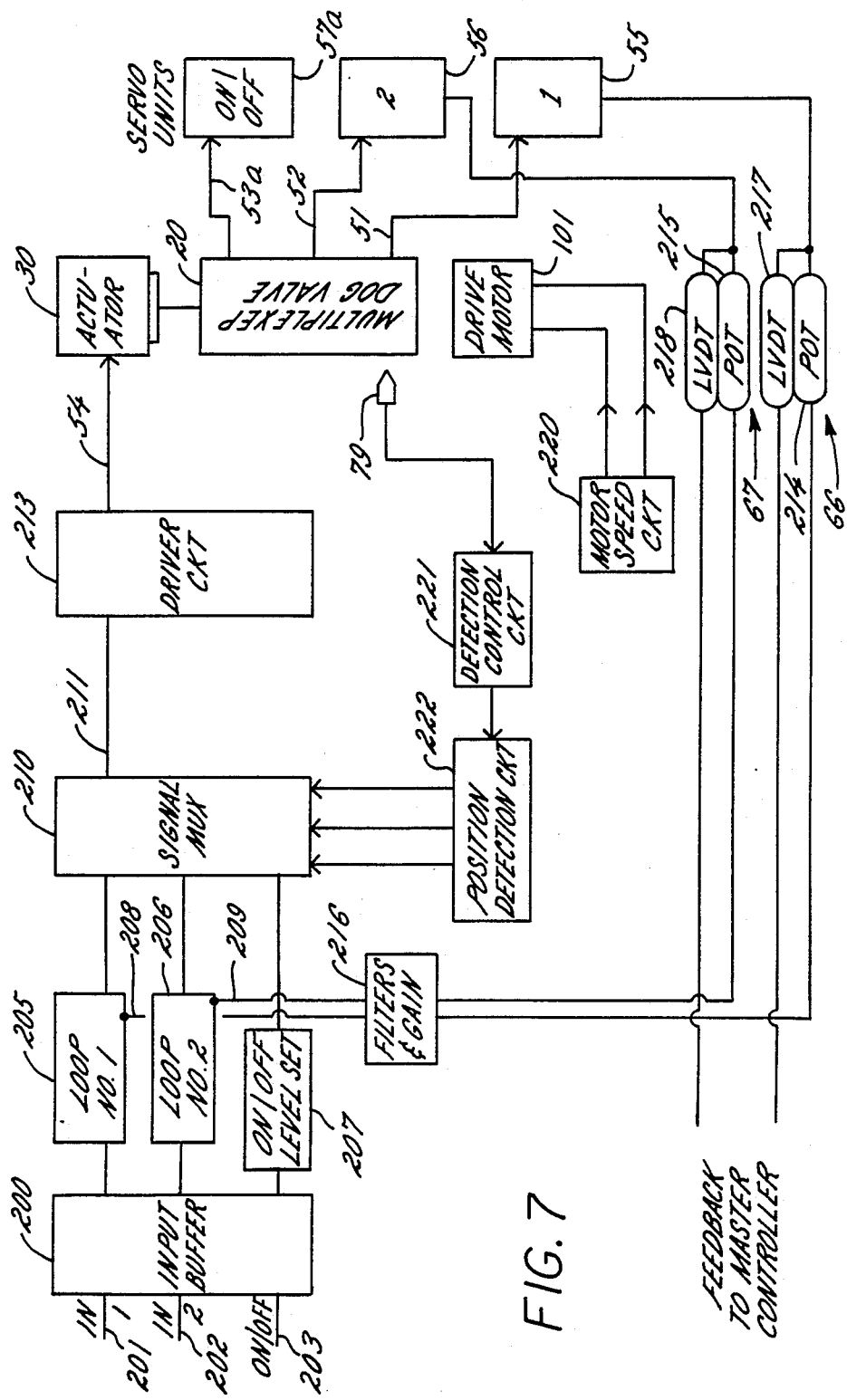
FIG. 7 is a block diagram showing an exemplary hydraulic multiplexed system associated with exemplary control circuitry.

Turning now to FIG. 7, there is shown a control loop for a three channel system similar to that disclosed in connection with FIG. 1, but differing in the structure of one of the channels. More particularly, two of the channels include servo actuators and their associated position feedback means, but a third channel illustrates a somewhat different control approach in that the actuator is a simple on/off device, and no position feedback is required. The system illustrates that one or several on/off devices can be intermixed with controlled position actuators in the multiplexed control.

Referring in greater detail to FIG. 7, there is shown an input buffer circuit 200 having three input signals coupled thereto on lines 201-203. Two of the input signals are like those described in connection with FIG. 1, i.e., have levels (typically current levels) which relate to a demanded position for the associated actuator. A third signal on line 203 is simply an on/off signal which demands that the actuator in the associated channel be switched either on or off. The signals having passed through the buffer 200 are coupled to associated control loops 205, 206, 207. The loops 205 and 206 are similar in that they compare the associated input signal from the buffer with a feedback signal on lines 208, 209, respectively, for establishing an output signal which is proportional to the flow intended to be sent to the associated actuator in the next cycle. As noted above, the feedback signal can be either a position signal or a rate signal, or both, which, when combined with the input demand signal as will be described below, produces an output signal for controlling the associated actuator.

The on/off signal from the third channel is coupled to on/off level set controller 207, and in this case needs no feedback from the associated actuator. The three signals from the three controllers are coupled as inputs to a signal multiplexer 210 which has a single output bus 211 having a time slot for each of the signals. The signal multiplexer in conventional fashion samples the input signals on its input lines and places samples in associated time slots for output on the TDM bus 211. Those signals are amplified in a driver circuit 213 and coupled on the TDM bus 26 to the linear actuator 30 which operates the multiplexed pilot valve 28.

FIG. 7 shows the pilot valve only schematically, with its hydraulic outputs 51, 52, 53a coupled to an associated servo actuator 55, 56, 57a. As in the previous embodiment, the servo actuators 55, 56 have feedback means 65, 66 coupled in the control loop. The actuator 57a is an on/off actuator driven by one output of the multiplexed dog valve 28. As shown in FIG. 5, a pair of feedback sensors may be provided for each servo actuator. The first includes potentiometers 214 and 215 which have signals passed through filter and gain circuitry 216 to serve as the feedback signals on lines 208 and 209. In addition, the feedback elements 95, 96 can include a second sensor illustrated as the LVDT sensors 217, 218 having lines coupled back as feedback to the master controller. The master controller may sense the position of the servos through the feedback means and adjust the demand signals on lines 201 and 202 to achieve actuator positions which might be computed by a master onboard computer.

Referring again to the multiplexed dog valve 28, it is driven by a motor 87 responsive to a driver circuit 220, the motor being coupled to the multiplexer for sequentially activating the valve sections 32-34. A position detector 46 is also associated with the rotating assembly for detecting the rotary position of the multiplexer and acting through detection control circuit 221 and position detection circuit 222 to provide signals which control the signal multiplexer 210. Thus, the actual position of the multiplexer, and thereby of the pilot ports with respect to the multiplexing elements, serves as a signal input which acts on the multiplexer 210 to control the time slots in which each of the electrical signals are placed. As a result, any delays in the control circuit can be compensated for so that the actuator 30 drives the multiplexed dog valve 28 to the position associated with a particular channel immediately before the multiplexer couples the hydraulic inlet ports to the associated pilot ports.

While the invention has been described in connection with a preferred construction for a multiplexed pilot valve, it will be appreciated that other structures may be utilized. For example, while the invention has provided individual pilot ports, one for each channel located in a unitary positionable spool, the invention can also be practiced with a single set of pilot ports and a multiplexing assembly which shares that single set of pilot ports among a plurality of peripherally disposed follower assemblies. The same principle, namely, fluid flow through the pilot ports causing the repositioning of the follower will apply to such a construction. Also, while emphasis has been placed on a three channel system, it will be clear that a larger or smaller number of channels can be provided if desired. Also, while a dedicated drive motor has been shown for rotation of the multiplexer, it will also be clear that a dedicated drive is not necessary, but the multiplexer can be rotated by a drive taken from the controlled equipment, such as by means of a gear box driven by a turbine engine.

It will now be appreciated that what has been provided is an improved multiplexed hydraulic control which provides continuous flow in the associated channel even though the channels are serviced on a discontinuous basis. By virtue of the mechanical interaction of the pilot and follower in initially setting a position to be followed then strictly following that position, system stability is enhanced by virtue of the mechanical feedback between the pilot and follower. Thus, the fluid flow amplification normally associated with a dog valve, i.e., a flow rate of a given magnitude controlling a much greater flow rate is achieved in a multiplexed configuration with the possibility of continuous flow to each of the multiplexed channels.

What is claimed is:

1. A time multiplexed hydraulic control system having a plurality of channels for individually controlling the positions of a plurality of servo actuators in the respective channels in accordance with a corresponding plurality of electrical control signals, the control system comprising the combination of:

a multiple section dog valve having one section for each channel, common electrical actuator means for the dog valve for sequentially responding to the plurality of electrical control signals;

each section of the dog valve having pilot means coupled to the electrical actuator for control thereby, follower means for following the position of the pilot means, and an output port having a flow rate controlled by the follower means;

multiplexing means in the dog valve for sequentially supplying fluid to the pilot means for sequentially positioning then locking the respective follower means; and means connecting the servo actuator in each channel to the associated output port of the multiple section dog valve for receiving fluid flow at a rate determined by the position of the follower means.

2. The hydraulic control system as set forth in claim 1 in which the pilot means comprises an elongate spool extending through the multiple sections of the dog valve, pilot ports in the spool, one for each section, and a metering land in the follower adapted to open the pilot port when positioned by the electrical actuator and close the pilot port by repositioning of the follower means.

3. The hydraulic control system as set forth in claim 1 further including:
   position sensor means for sensing the angular position of the dog valve and producing an electrical signal representing said position;
   control means for producing the plurality of electrical control signals, said control means being responsive to the electrical signal from the position sensor means for coordinating the electrical control signals coupled to the electrical actuator with the angular position of the dog valve.

4. The hydraulic control system as set forth in claim 1 further including feedback means for producing signals relating to the position of the servo actuators and modifying the electrical control signals in accordance therewith.

5. A multiplexed dog valve for controlling fluid flow to a plurality of channels in accordance with a corresponding plurality of electrical control signals, the multiplexed dog valve having a plurality of sections, one for each channel, and comprising, in combination:
   a linearly positionable spool having a plurality of pilot ports therein, one for each of the channels;
   rotatable multiplexer means associated with the spool for sequentially connecting the pilot ports to a fluid source thereby sequentially enabling the pilot ports;
   linear actuator means for responding to the sequence of electrical control signals for controlling the linear position of the spool and linear actuator means for responding to the sequence of electrical control signals for controlling the linear position of the spool and thereby the opening of the pilot port enabled by the multiplexer means;
   follower means for each section of the dog valve operatively coupled to the associated pilot port, the follower means having a multiplexed metering means for opening the pilot port in response to repositioning of the spool and closing of the pilot port upon repositioning of the follower, the multiplexing means serving to lock the follower in position when other sections of the dog valve are enabled by the multiplexer means;
   an outlet port, one for each channel, metering means associated with the outlet port for controlling the degree of opening of the outlet port in response to the position of the follower means;
   whereby the pilot ports sequentially reposition the follower means during the associated multiplexed time slots for controlling the degree of opening of the outlet port to continuously control fluid flow to the associated channels.

6. The dog valve as set forth in claim 5 further including:
   position sensor means for sensing the angular position of the dog valve and producing an electrical signal representing said position;
   control means for producing the plurality of electrical control signals, said control means being responsive to the electrical signal from the position sensor means for coordinating the electrical control signals coupled to the linear actuator with the angular position of the dog valve.

* * * * *